(12) United States Patent
Balasubramanian et al.

(10) Patent No.: US 9,799,049 B2
(45) Date of Patent: Oct. 24, 2017

(54) ENHANCING A MESSAGE BY PROVIDING SUPPLEMENTAL CONTENT IN THE MESSAGE

(71) Applicant: Nuance Communications, Inc., Burlington, WA (US)

(72) Inventors: Sundar Balasubramanian, Seattle, WA (US); Michael McSherry, Seattle, WA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 163 days.

(21) Appl. No.: 14/633,088

(22) Filed: Feb. 26, 2015

(65) Prior Publication Data

US 2016/0173428 A1 Jun. 16, 2016

Related U.S. Application Data

(63) Continuation-in-part of application No. 14/570,934, filed on Dec. 15, 2014.

(51) Int. Cl.
| | |
|---|---|
| *G06F 17/20* | (2006.01) |
| *G06F 17/27* | (2006.01) |
| *G10L 21/00* | (2013.01) |
| *G10L 19/02* | (2013.01) |
| *G10L 15/28* | (2013.01) |
| *G10L 15/18* | (2013.01) |
| *G06Q 30/02* | (2012.01) |
| *G06F 17/30* | (2006.01) |
| *H04L 12/58* | (2006.01) |

(52) U.S. Cl.
CPC ..... *G06Q 30/0255* (2013.01); *G06F 17/3051* (2013.01); *G06F 17/3064* (2013.01); *G06F 17/30699* (2013.01); *G06F 17/30867* (2013.01); *H04L 51/16* (2013.01); *H04L 51/08* (2013.01)

(58) Field of Classification Search
CPC ............................ G06F 17/276; G06F 3/0237
USPC ............ 704/9, 2, 4, 200, 202, 204; 707/608, 707/604, 603
See application file for complete search history.

(56) References Cited

U.S. PATENT DOCUMENTS

| 5,632,002 A * | 5/1997 | Hashimoto | ............. G06F 3/165 704/231 |
|---|---|---|---|
| 6,872,015 B2 * | 3/2005 | Roosen | ................. G06F 3/1291 358/1.15 |
| 6,949,729 B1 * | 9/2005 | Ishikawa | ................ H05B 6/688 219/702 |
| 7,230,731 B2 * | 6/2007 | Dan | ...................... G06F 21/608 358/1.14 |
| 7,444,354 B2 * | 10/2008 | Kaburagi | .......... G06F 17/30265 |
| 7,584,203 B2 * | 9/2009 | Satomi | ............. G06F 17/30286 |

(Continued)

*Primary Examiner* — Akwasi M. Sarpong
(74) *Attorney, Agent, or Firm* — Perkins Coie LLP

(57) ABSTRACT

The present technology relates to enhancing a message with supplemental content. The system may enhance a message based on topics identified in past correspondence messages or topics anticipated based on an intended recipient of a correspondence message being drafted. The system can operate in combination or conjunction with a language prediction system, an optimizing language model, and a text input method. The systems and methods provide users with supplemental content at a time and in a specific situation, which allows for effective targeting of content.

20 Claims, 11 Drawing Sheets

(56) References Cited

U.S. PATENT DOCUMENTS

| | | | |
|---|---|---|---|
| 7,619,764 B2* | 11/2009 | Fukunaga | H04N 1/32427 358/1.15 |
| 7,777,904 B2* | 8/2010 | Van Den Tillaart | B41J 29/38 358/1.15 |
| 7,783,970 B2* | 8/2010 | Chikamura | G11B 27/034 715/230 |
| 7,809,553 B2* | 10/2010 | Fux | G06F 17/2715 341/50 |
| 7,818,342 B2 | 10/2010 | Stuhec | |
| 8,127,364 B2* | 2/2012 | Koike | G06F 21/74 726/26 |
| 8,169,643 B2* | 5/2012 | Yamada | H04N 1/32133 358/1.1 |
| 8,199,170 B2* | 6/2012 | Mishima | G06F 3/0421 345/619 |
| 8,307,002 B2* | 11/2012 | Ooba | H04N 1/00838 707/784 |
| 8,335,869 B2* | 12/2012 | Koike | G06F 13/4081 710/15 |
| 2002/0087309 A1* | 7/2002 | Lee | G06Q 30/06 704/240 |
| 2002/0126097 A1* | 9/2002 | Savolainen | G06F 3/0237 345/168 |
| 2003/0072023 A1* | 4/2003 | Tanaka | G06F 9/4843 358/1.13 |
| 2003/0074373 A1* | 4/2003 | Kaburagi | G06F 17/30265 |
| 2003/0107756 A1* | 6/2003 | Dan | G06F 21/608 358/1.14 |
| 2003/0167264 A1 | 9/2003 | Ogura et al. | |
| 2003/0217240 A1 | 11/2003 | Satomi et al. | |
| 2004/0128270 A1* | 7/2004 | Bachman | G06F 17/30286 |
| 2004/0139052 A1* | 7/2004 | Kazushige | H04L 29/06 |
| 2004/0174561 A1* | 9/2004 | Fukunaga | G06F 3/1288 358/1.15 |
| 2005/0033582 A1* | 2/2005 | Gadd | G06Q 30/02 704/277 |
| 2006/0265208 A1* | 11/2006 | Assadollahi | G06F 3/0237 704/9 |
| 2007/0014131 A1* | 1/2007 | Oh | H02M 7/53803 363/21.05 |
| 2007/0077925 A1* | 4/2007 | Hiyama | H04M 1/66 455/420 |
| 2007/0081189 A1* | 4/2007 | Kamei | G06F 21/6209 358/1.18 |
| 2007/0083193 A1* | 4/2007 | Werneth | A61B 5/0422 606/41 |
| 2007/0236730 A1* | 10/2007 | Takeuchi | G06F 9/4443 358/1.15 |
| 2008/0024592 A1* | 1/2008 | Bang | H04N 1/00307 348/14.02 |
| 2008/0201143 A1* | 8/2008 | Olligschlaeger | H04M 3/2281 704/235 |
| 2008/0238948 A1* | 10/2008 | Mishima | G06F 3/0421 345/672 |
| 2009/0024771 A1* | 1/2009 | Koike | G06F 13/4081 710/18 |
| 2009/0067805 A1* | 3/2009 | Kuroda | G11B 27/105 386/243 |
| 2009/0075734 A1* | 3/2009 | Saito | G07F 17/3211 463/37 |
| 2009/0185763 A1* | 7/2009 | Park | H04M 1/7253 382/311 |
| 2009/0210688 A1* | 8/2009 | Kohiga | G06F 8/4434 713/1 |
| 2010/0076761 A1* | 3/2010 | Juergen | G10L 15/197 704/235 |
| 2010/0100568 A1* | 4/2010 | Papin | G06F 17/276 707/794 |
| 2010/0226485 A1* | 9/2010 | Matsushima | H04M 1/576 379/142.04 |
| 2010/0231945 A1* | 9/2010 | Tanaka | H04N 1/00408 358/1.13 |
| 2011/0231411 A1* | 9/2011 | Shein | G06F 17/3071 707/749 |
| 2013/0185054 A1* | 7/2013 | Xiao | G06F 3/018 704/9 |
| 2014/0067731 A1* | 3/2014 | Adams | G06N 99/005 706/12 |
| 2014/0136323 A1 | 5/2014 | Zhang et al. | |
| 2014/0215505 A1* | 7/2014 | Balasubramanian | H04N 21/4722 725/13 |
| 2014/0267045 A1* | 9/2014 | Grieves | G06F 17/2735 345/168 |
| 2014/0351350 A1 | 11/2014 | Lee et al. | |
| 2015/0244883 A1* | 8/2015 | Tanaka | H04N 1/00408 358/1.13 |
| 2016/0170971 A1 | 6/2016 | McSherry et al. | |
| 2016/0171538 A1 | 6/2016 | Balasubramanian et al. | |

\* cited by examiner

500

| Basketball | Mountain | Mexico | Hunger |
|---|---|---|---|
| Lakers | Snowboarding | Tequila | Take-out |
| Durant | Rainier | Cabo San Lucas | Reservations |
| SuperSonics | Mount Everest | Mazatlán | I'm eating |

| Trigger | Supplemental Content |
|---|---|
| Capital Grille | Menu.pdf<br><br>Map and directions<br><br>Weather<br><br>Phone number |
| Space Needle | Space Needle Reservations<br><br>Reservations are available during the following hours.<br><br>Brunch -- Sat & Sun: 9:30am -- 2:45pm<br><br>Lunch -- Mon -- Fri: 11:00am -- 2:45pm<br><br>Dinner -- Mon -- Sun: 5pm -- 9:45pm<br><br>Reservations office hours are Monday through Sunday:<br><br>9am -- 8pm |
| Mariners tickets; baseball tickets; let's go to a game soon | The Seattle Mariners<br><br>Tickets available for tonight's game. *Buy Tickets*.<br><br>Upcoming schedule:<br><br>Thursday, June 7 -- vs. Boston Red Sox @ 7:05pm<br><br>Friday, June 8 -- vs. New York Yankees @ 7:05pm<br><br>Saturday, June 9 -- vs. New York Yankees @ 1:05pm<br><br>Weather<br><br>Season opening<br><br>Season closing |

*FIG. 9*

ENHANCING A MESSAGE BY PROVIDING SUPPLEMENTAL CONTENT IN THE MESSAGE

CROSS-REFERENCE TO RELATED APPLICATIONS AND PRIORITY CLAIM

The present application is a continuation-in-part of U.S. patent application Ser. No. 14/570,934, filed Dec. 15, 2014, entitled OPTIMIZING A LANGUAGE MODEL BASED ON A TOPIC OF CORRESPONDENCE MESSAGES, which is incorporated by reference herein in its entirety.

BACKGROUND

Messaging applications receive content from users in a variety of ways. Users can fill messages with text or media, entering this content using a keyboard, touchscreen, or the like. Sometimes users wish to enter more information than is practical in a given message. For example, a user may wish to send reviews of a restaurant to his friend. Messaging applications permit users to link to supplementary information, via, for example, a web site address. But entering the link can be cumbersome, and finding the correct information to link to consumes an inordinate amount of time. Further, at times the supplementary information, if provided, is provided at an inopportune or inappropriate time.

The need exists for a system that overcomes the above problems, as well as one that provides additional benefits. Overall, the above examples of prior or related systems and their associated limitations are illustrative, but not exclusive. Other limitations of existing or prior systems will become apparent to those of skill in the art upon reading the following Detailed Description.

BRIEF DESCRIPTION OF THE DRAWINGS

Embodiments of the present disclosure will be described and explained through the use of the accompanying drawings in which:

FIG. 5 is a representative table showing topics and text associated with those topics;

FIG. 9 shows a table containing representative triggers and supplemental content for enhancing a message.

DETAILED DESCRIPTION

Figure 1:
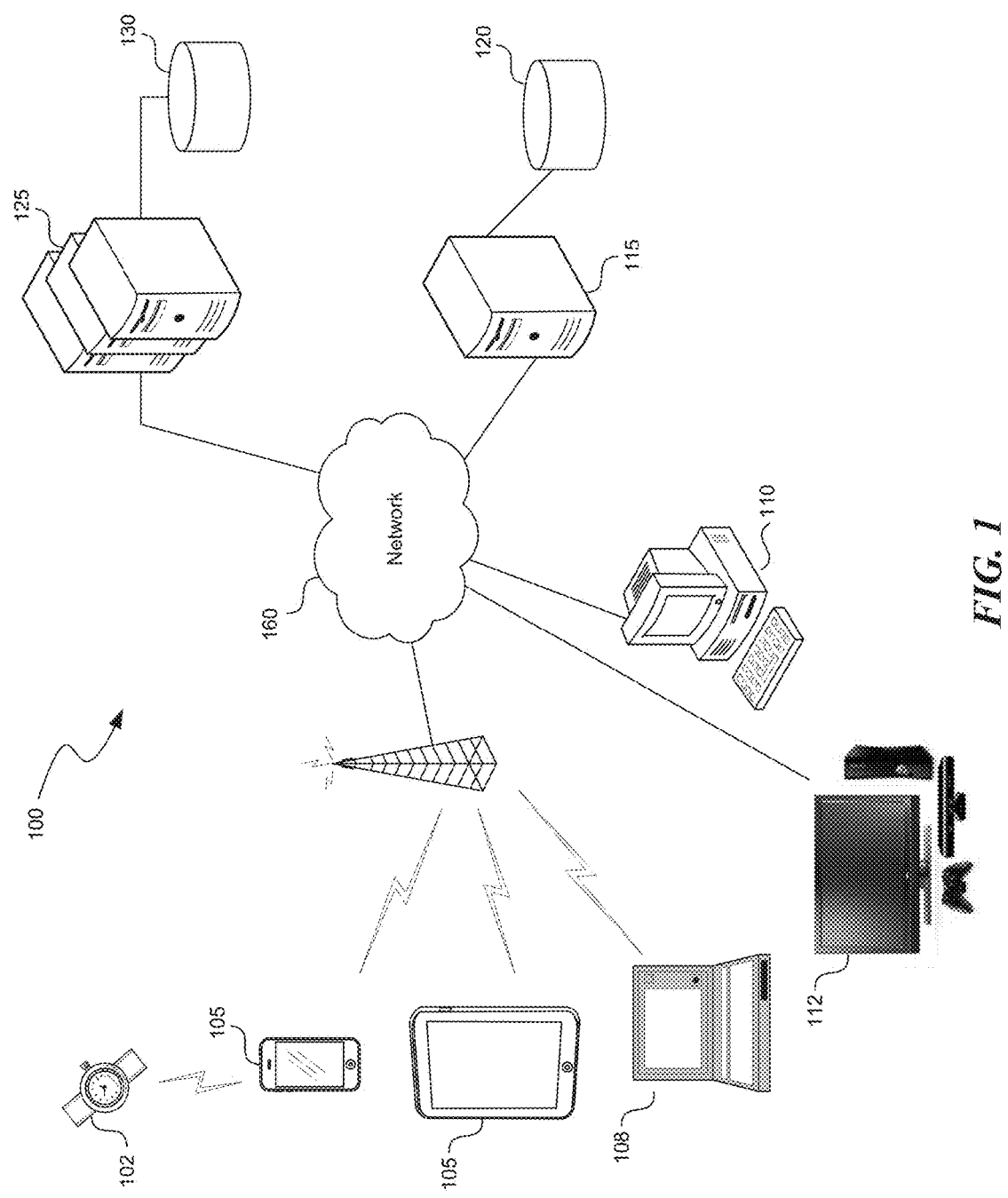
FIG. 1 is a diagram of a suitable environment in which a system for entering supplemental content in a message may operate.

The following method and system describe enhancing a message with supplemental content. Enhancing a message with supplemental content includes leveraging topical language models for scenario-based advertising. For example, the system enhances a correspondence between two parties using a text messaging platform. On the text message platform, the message correspondence between the two users may include words and phrases such as: "meet at 8:00 pm tonight," "the Beatles," "rock music," "did you buy tickets yet?," "is it raining?," or "which bar do you want to meet at before the Beatles concert?". These phrases and words trigger the system to present supplemental content in the message; for example, the system will embed a link to buy concert tickets in the message based on the trigger "tickets". In another example, the system includes the location and velocity of each user as supplemental content to assist each user in planning the event. In general, the supplemental content can be in several forms including, but not limited to: a link, a deep link, or a menu display that appears when the user's finger hovers over a certain part of the message.

Furthermore, the system may continuously, sporadically, or periodically enhance messages with supplemental content in several ways. The system will enhance the conversation based on topics identified in past messages, topics anticipated based on an intended recipient of a message, or the context in which a party is sending or receiving a message. The system can operate in combination or conjunction with a language prediction system, such as a next word prediction application used by a virtual keyboard, which provides improved supplemental content for conversations related to identified topics.

The disclosed technology has several advantages. First, users will easily navigate between the conversation and enhanced conversation with supplemental content. This will allow the user to quickly verify information, make plans, and execute operations without having to consult a different resource. Second, advertising businesses will better be able to target users because users will view supplemental content (e.g., ads, links, business locations) at the exact time a user needs the information, that is, the disclosed technology identifies the right moment to engage the user and insert an ad or other supplemental content. Specifically, the system will enhance a conversation based on the topic of conversation, and this allows the system to use different moments (e.g., anxiety, excitement, hunger, frustration, success, etc.) to insert supplemental content related to the topic of conversation at an opportune time. Third, the supplemental content integrates a user's preferences, past and present conversations, language selection, and user context to enhance a message, which is not traditionally done. Fourth, the disclosed technology can assist companies in taking advantage of the sequence of events in conversation. Specifically, once the disclosed technology gains insight into an upcoming event between two parties based on a topic of conversation, the disclosed technology can suggest supplemental content at certain times. For example, if two parties plan to attend a movie, the disclosed technology may first suggest supplemental content like movie trailers and movie showing times; then later in the conversation, it may suggest a place to get a drink after the movie. Also, after the movie is over, the disclosed technology may suggest contacting a cab service in a message from one party to another regarding returning home. Overall, the disclosed technology factors in the sequence of events, weather, time of day, and the like to determine when and what type of supplemental content to suggest to a user for insertion in to a conversation.

For enhancing a message with supplemental content in messages, a dialogue-based language model can be helpful. Specifically, if the system identifies a topic in past correspondence messages or anticipates a topic for text being entered by a user, it can keep all topics active in a correspondence or "conversation". Then, as described above, the topics trigger supplemental content associated with word lists available to users in a conversation. As an example of how a company uses this information to advertise, a "scenario" may be defined as the intersection of two topics, with a pre-defined threshold for each topic. For example, the scenario may be defined as "hunger and interested in baseball", and the system has determined that the intersection of baseball is at or above a 30% threshold and the intersection of hungry is at or above a 50% threshold. This means of all active topics of conversation, baseball is above a 30% in importance and hunger is above a 50% in importance. If an advertiser determines this is scenario is relevant, the advertiser could use the system to identify these moments and display an ad (e.g., buy baseball tickets and nachos), which is relevant supplemental content. The users will likely find this supplemental content useful given their topic of conversation is food and baseball, and an embedded link with a sale will enhance their conversation.

Furthermore, advertisers can exploit topic correlations to cross advertise. For example, football and pizza companies can work together to advertise to customers interested in supplemental content related to football and pizza for conversation. Specifically, if one party sends a message to another party stating "let's watch the game and eat some pizza," the other party may respond with a message including an embedded link to a pizza coupon valid for the day of the game. Moreover, while pizza and football companies benefit from exploiting a known topic correlation of pizza and football, there are unknown correlations that companies can also exploit. The present technology reveals new trends in language that would not otherwise be obvious. For example, while pizza and football involve a known correlation, there may be unknown topic correlations in a conversation regarding football and gym memberships. With the lexical analysis and topic correlation described in this disclosure, companies can exploit the unknown correlations and new language trends in a conversation to include supplemental content and target a specific audience.

The system of the present disclosure receives all correspondence messages of a conversation. As a result, it can identify topics discussed by parties other than the user of the device, and the system can adjust a language model to account for the topics identified. When the system determines that a topic has gone idle or changed, it can shift priorities of words or combinations of words in a language model. Several topics can be accounted for at a given time, and the disclosed system can optimize a language model for the multiple topics. In some implementations, the system forms a linguistic graph across multiple users, enabling the system to anticipate lexical needs before a party even starts drafting a correspondence message. For example, the system may disseminate an optimized language model among related parties. Accordingly, if two parties are discussing a particular subject, and a user initiates a conversation with one of the two parties, the system may utilize a language model optimized for the conversation between the two parties, anticipating the lexical needs of the user for the new conversation.

The disclosed system and method incorporate the above mentioned optimized language model into enhancing the supplemental content of a message. For example, the system creates a language model and optimizes as described above. Then, the system uses the language model in conjunction with triggers for supplemental content. In some embodiments of the system, if the language module includes ballet, evening plans, and holidays, the system may display supplemental content for tickets to the Nutcracker Ballet within the text messaging platform. The supplemental content can be in the form of a link or a menu for selecting dates to attend the performance.

The following paragraphs describe various implementations of the invention and specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used is intended to be interpreted in its broadest reasonable manner, even though it is used in conjunction with a detailed description of certain specific implementations of the invention.

The following discussion includes examples of a system for entering enhanced content in a message. The system is described with respect to a number of processes that it may implement and numerous examples of how it may be implemented.

Suitable Environments

FIG. 1 and the following discussion provide a brief, general description of a suitable computing environment 100 in which a system for enhancing a message, as described herein, can be implemented. Although not required, aspects and implementations of the invention will be described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network 160, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the example of FIG. 1, a system according to embodiments of the invention operates in or among wearable devices 102, mobile devices 105, laptop computers 108, personal computers 110, video game systems 112, and/or one or more server computers 115. The mobile devices 105, laptop computers 108, personal computers 115, and video game systems 112 communicate through one or more wired or wireless networks 160 with the server 115. The wearable computer 102 can communicate via a wireless connection (e.g., via a short-range wireless protocol) with, for example, the mobile devices 105. A data storage area 120 contains data utilized by the system, and, in some implementations, software necessary to perform functions of the system. For example, the data storage area 120 may contain language models and correspondence messages.

The system communicates with one or more third-party servers 125 via public or private networks. The third-party servers 125 include servers maintained by entities, such as third-party corporations, and provide enhanced or supplementary content for entering in a message. The third-party servers may communicate with data storage area 130. The wearable computer 102, mobile devices 105, laptop computer 108, personal computers 110, video game consoles 112, and/or another device or system, display a user interface for receiving input by a user to a message and for displaying enhanced content.

Suitable System

Figure 2:
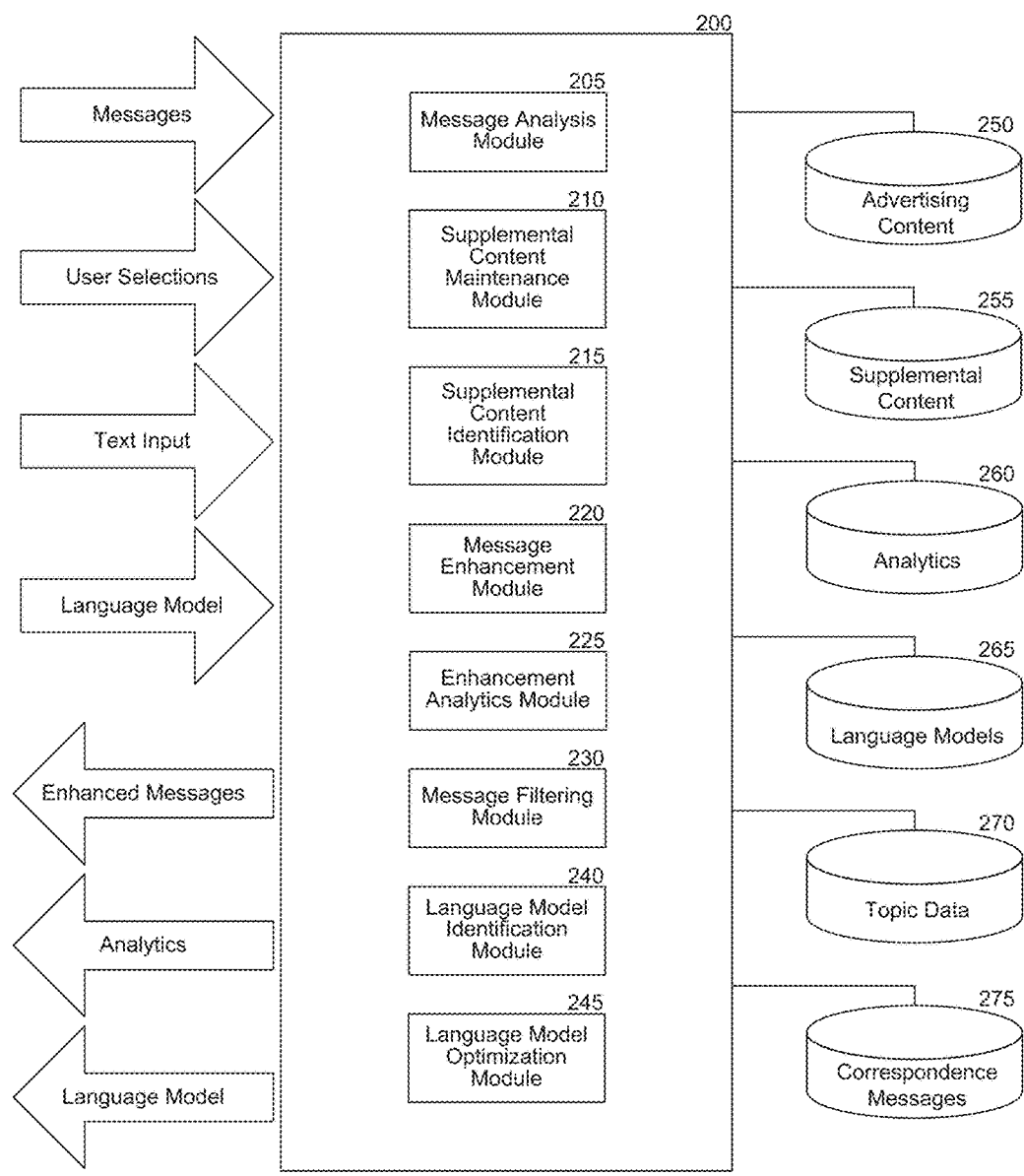
FIG. 2 is a block diagram of a system for entering supplemental content in a message.

FIG. 2 is a block diagram of a system 200 for enhancing a message by associating supplemental content with a portion of the message. The system 200 can operate on or among the wearable computer 102, mobile devices 105, laptop computer 108, personal computer 110, video game consoles 112, and/or another device or system, and it may be distributed among such devices and, for example, the server 115. The block diagram of system 200 enhances a message by associating supplemental content with a portion of the message as in the process described in FIG. 7. Also, block diagram of system 200 incorporates optimizing a language model based on a topic of correspondence messages as in FIG. 3. Importantly, one with ordinary skill in the relevant the art will appreciate how enhancing a message with supplemental content relates to optimizing a language model based on topic correspondence because the topics in the correspondence relate to enhancing messages.

The system 200 include a message analysis module 205, a supplemental content maintenance module 210, a supplemental content identification module 215, a message enhancement module 220, enhancement analytics module 225, a message filtering module 230, a language model identification module 240, and a language model optimization module 245. The system reads data from and stores data in advertising content data storage 250, supplemental content data storage 255, and analytics data storage 260. The system stores data in and accesses data from analytics database 260, language models data storage 265, topic data storage database 270, and correspondence messages data storage 275. Other databases, not shown, can be connected. Also, while the databases are shown separately, the databases can be integrated into one database.

The system receives messages, including messages sent by a user and text or other content entered into a message but not yet sent. The system also receives user selections, language models, and text input. The system outputs enhanced messages, analytics, and language models.

The message filtering module 230 maintains and filters messages for identifying relevant topics for a user. The message filtering module 230 receives messages, text input, user selections, and retrieves from and stores correspondence messages in correspondence messages data storage 275. The message filtering module 230 also filters correspondence messages based on various criteria. In some implementations, the message filtering module filters correspondence messages based on a user of a mobile device having sent or received a message. The message filtering module 230 can filter messages based on a party to whom a message was sent, a party from whom a messages was received, and so forth. For example, the message filtering module 230 may filter messages according to a user and a party to whom the user addressed a message. In some implementations, the system filters messages based on a time a message was sent. For example, the system filters messages according to a predetermined time period before the system optimizes the language model. The message filtering module 230 also can filter messages based on an application used for generating or sending a message, or based on a format of a message.

The message analysis module 205 identifies topics in filtered correspondence messages. The message analysis module 205 also examines new messages to determine whether previously-identified topics are still active. A topic is something referred to, explicitly or implicitly, in one or more correspondence messages. Topics include objects, ideas, feelings, places, and the like. The system can identify multiple topics in correspondence messages. For example, successive correspondence messages may refer to a Mariners baseball game, and the system identifies both "Mariners" and "baseball" topics. In some implementations, the system raises priorities for words associated with a topic by a greater degree than priorities for words associated with other topics.

Topics are identified in many ways. In some implementations, a topic is identified based on keywords appearing or repeated in correspondence messages. For example, the message analysis module 205 may compare correspondence messages to a list of keywords and determine that a topic has been referred to if an associated keyword is found in the correspondence messages. In some implementations, the message analysis module identifies a topic based on a word's or phrase's frequency is used in correspondence messages. For example, if a word is used three times among five messages sent and received by a user, the system may identify the word or an associated word as a topic. In some implementations, the message analysis module 205 identifies a topic based on a question and answer pair. For example, the system may identify a question in a message from a user to a party and a one word response by the user, and the system may determine that the word responded with by the user is a topic. Thus, for the question and answer pair, "Where are you going to visit on vacation?" and, "London," the system may identify "London" as a topic.

The language model identification module 240 identifies a language model to optimize. Language models may be received by the system or identified in language models data storage 265. In some implementations, the language model identification module 240 identifies a default language model. In other implementations, the language model 240 identification module selects a language model to optimize based on a language model previously used for a user. For example, the language model 240 identification module may identify a language model to optimize based on a language model that was previously used by a language prediction application for predicting input by a user, or a language model previously used for predicting input by the user for a message sent to a particular recipient. The identified language model may comprise a language model that has already been optimized by the system 200.

The language model optimization module 245 optimizes the language model identified by the language model identification module 240 based on topics identified by the message analysis module 205 and/or topics anticipated based on a received user selection. As discussed above, the message analysis module 205 can identify topics in past correspondence messages. The language model optimization module 245 also identifies topics in a received user selection. For example, user selection includes that the intended recipient of a draft message is a particular party or type of party. For example, a user selection may indicate that the user has chose to initiate an instant messaging session with customer service related to a particular technology or product. The language model may determine that the technology or product contained in the customer service request is initiated is a topic.

The language model optimization module 245 optimizes a language model by increasing or reducing a priority of a word in the language model. For example, the language model optimization module 245 may adjust a probability associated with a word or multiple words from the language model based on topics identified by the message analysis module 205 and topics in user selections. The language model optimization module 245 optimizes a language model based on information associated with topics identified in correspondence messages.

Topics identified by the message analysis module 205 may be compared to data stored in topic data storage 270. Topic data storage may contain data correlating words and phrases with topics. For example, a topic, "Baseball," may be associated with words and phrases including "Babe Ruth," "Ichiro," "homer," "grand slam," "Cooperstown," "7th inning stretch," "Take Me Out to the Ballgame," and "hot dog."

In some implementations, system 200 may generate data correlating topics and associated words and phrases by examining correspondence messages identified as being related to a topic. In some implementations, a technician creates data correlating topics and associated words and phrases. The data correlating words and phrases with topics may include a ranking or weight indicating a degree to which a word or phrase is related to a topic. In some implementations, the language model optimization module 245 alters a priority associated with a word in a language model based on a ranking or weight associated with the word. For example, "Babe Ruth" and "Ichiro" may be associated with a weight of five, and "Cooperstown" and "7th inning stretch" may be associated with a weight of three, and the language model optimization module may alter a priority associated with these words by a factors of five and three, respectively.

Also, the message analysis module 205 receives messages from a user of a device and analyzes the messages to determine whether supplemental content is available that relates to the message. The received messages include a message being drafted by a user. For example, the system can receive text input directly from a keyboard being used to type a message. The message analysis module 205 compares messages to triggers stored in supplemental content data storage 255. As discussed herein, triggers are words, phrases, and the like, that are associated with supplemental content. The message analysis module 205 can identify a trigger in a message despite the precise trigger not being recited in the message. For example, the message analysis module may identify synonyms of triggers in a message, may use stemming to identify related words, etc.

The message analysis module 205 can also include topics in its analysis. For example, while the message may not contain an exact phrase or word, the message analysis module 205 may identify related supplemental content from the topic of conversation. Also, the message analysis module 205 can communicate with the language model optimization module 245, which identifies past/present topics. The message analysis module 205 can use the optimized language to determine if a particular conversation includes triggers for supplemental content.

The supplemental content maintenance module 210 maintains supplemental content stored in supplemental content data storage 255. Supplemental content includes text, images, video, and audio, which the system can associate with a portion of a message and display to a user viewing the message. For example, supplemental content may be a dinner menu from a restaurant, comprising text and images. The system may also store links, URLs, or logical network locations where supplemental content may be accessed or retrieved from the network, rather than storing the content in the data storage. The supplemental content maintenance module 210 also maintains metadata associated with supplemental content. Metadata associated with supplemental content describes triggers that are associated with the supplemental content. FIG. 5 shows a table correlating representative supplemental content and triggers.

The supplemental content can be received from entities or users. For example, a restaurant may submit supplemental content and related triggers to the system. The supplemental content maintenance module 210 can store supplemental content in association with triggers for quick identification of supplemental content to add to a message. The supplemental content identification module 215 identifies supplemental content to enter in a message based on triggers identified by the message analysis module 205. In some implementations, a trigger is associated with variations of supplemental content, and the supplemental content identification module identifies the relevant supplemental content for a particular message. For example, a user may refer to a restaurant that has different locations, and supplemental content associated with a trigger for the restaurant (e.g., the restaurant's name) may include address information for the various locations. The supplemental content identification module 215 can identify the relevant supplemental content for the message based, for example, on a location of a device that is receiving or displaying the message. Thus, the system may determine the appropriate supplemental content based not only on the trigger obtained from the message(s), but also on context data (e.g. location data, applications active on the device, time of day), sensor data (e.g. temperature, acceleration/velocity, heading), or both. Identifying supplemental content can also be related to probabilities within the database. For example, the described technology may assign probability to triggers for supplemental content: hot dogs (0.2), hungry (0.5), baseball (0.7), and tickets (0.8). The supplemental content associated with these triggers may be displaying baseball tickets for purchase. Thus, if users are corresponding regarding hot dogs, baseball, and buying tickets, the system will display baseball tickets and a coupon for hotdogs as supplemental content because there is a high probability the parties intend to go a baseball game and eat (the conversation involves several triggers with significant probability of relating to specific supplemental content). A technician can arbitrarily set the probability or include an algorithm to estimate the probability for including or not including supplemental content.

The message enhancement module 220 receives identified supplemental information from the supplemental content identification module 215 and enters the supplemental content in the message analyzed by the message analysis module 205. The message enhancement module 220 can embed supplemental content in the message. It can also embed a link to the supplemental content in the message. In some implementations, the message enhancement module 220 accesses templates in the supplemental content storage area 255 for formatting the supplemental content. The message enhancement module can also modify the supplemental content for entry into a message. The message enhancement module 220 outputs an enhanced message, which includes the identified supplemental content. The message enhancement module also displays supplemental content in a received message if a user selects to view supplemental content.

The enhancement analytics module 225 analyzes the usage of supplemental content, including whether a user selects to add identified supplemental content to a message. Likewise, the enhancement analytics module 225 analyzes a user's engagement with a received message that includes supplemental content, including, for example, whether the user selects to view or otherwise engage with the supplemental content included in the message. The enhancement analytics module stores analytics data in analytics data storage area 260. The enhancement analytics module 225 accesses analytics data and templates in analytics data storage area and generates analytics reports, which the system outputs.

Suitable Processes

The system 200 enhances a message by associating supplemental content with a portion of the message. The system 200 uses a variety of methods to first identify portions of a message to enhance and then content with which to enhance those portions.

Figure 3:
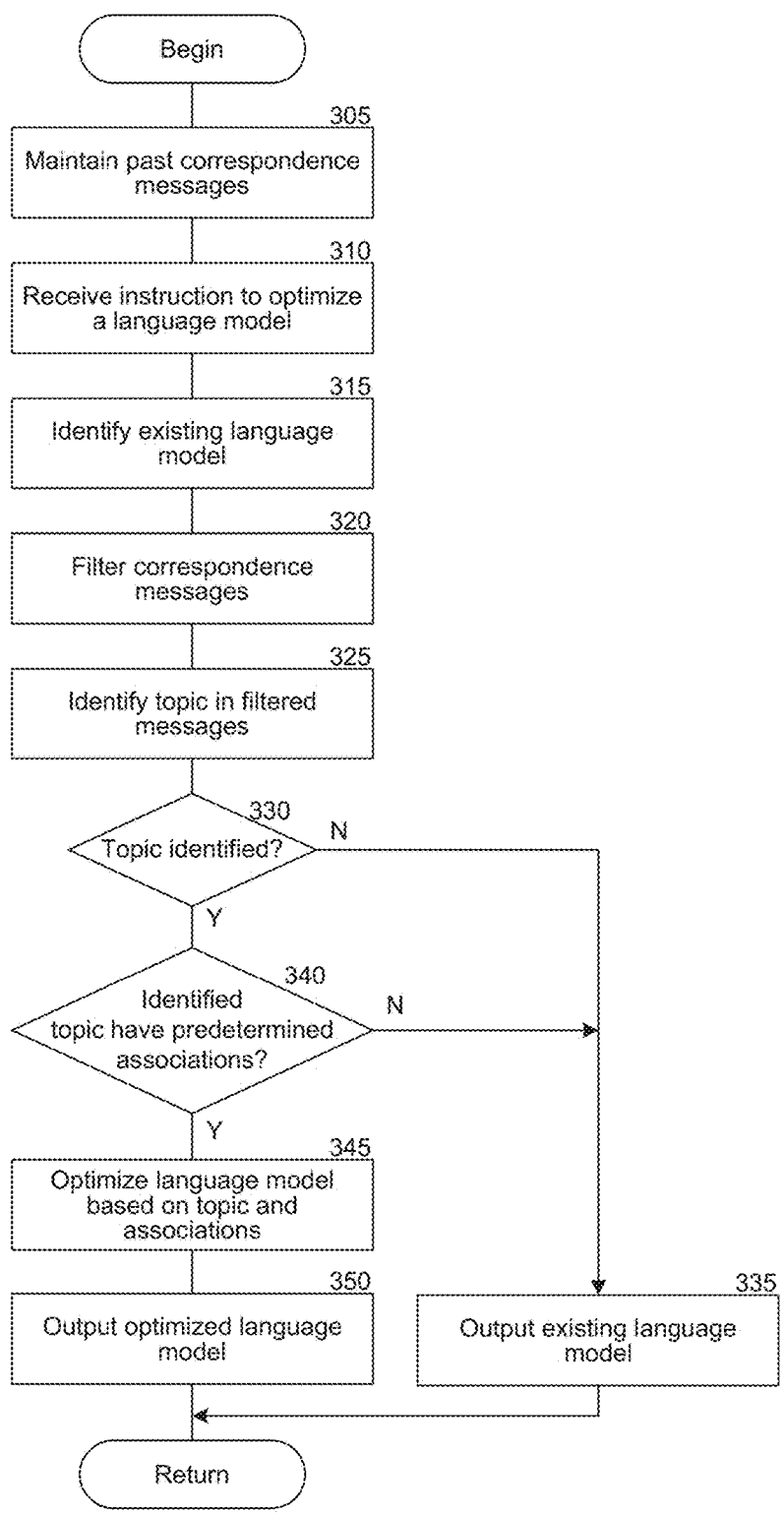
FIG. 3 is a flow diagram depicting a method performed by a system for optimizing a language model based on a topic identified in correspondence messages, this method can work in conjunction with the method described in FIG. 7.

FIG. 3 is a flow diagram of a process 300 performed by the system 200. The process 300 is related to identifying an optimized language model based on content of correspondence messages, which can be incorporated into enhancing a message with supplemental content for a user as in FIG. 7.

At a block 305, the system 200 maintains past correspondence messages. As discussed above, correspondence messages include text-based messages exchanged between two or more parties. The parties can include a user of a computing device on which the system is operating and/or other parties. The correspondence messages may be received by the system continuously, sporadically or periodically.

At a block 310 the system 200 receives an instruction to optimize a language model for a language prediction application. The instruction may be generated when the language prediction application is launched, such as after a user selects to enter text into a correspondence message or while a user is entering text. The instruction may also be received after a device launches a virtual keyboard. In some implementations, the system is configured to continuously or periodically optimize a language model based on new correspondence messages drafted by the user or by other parties.

The instruction to identify an optimized language model may include parameters or other information related to the instruction. In some implementations, the system receives context information related to text entry by a user. For example, the system may receive information related to a party to whom the user is drafting a message, such as the party's name or occupation, whether multiple parties are addressed by the message, and so forth. Context information also includes an application to receive text entry by a user, and text already entered by the user.

At a block 315, the system 200 identifies an existing language model. The system may identify a default language model used by the language prediction application. In some implementations, the system identifies a language model from among multiple language models, or identifies parameters to apply to a default language model. For example, the system may identify a language model that has been modified based on information learned about a user or based on a user's use of a device. The existing language model may already have been optimized by the system 200. For example, the system may identify an existing language model that was already optimized for the user based on topics identified in correspondence messages.

At a block 320, the system 200 filters the correspondence messages. The system may filter messages according to various criteria. In some implementations, messages are filtered based on the parameters or other information related to the instruction received at block 310. For example, the system may identify in information related to a received instruction that a user is drafting a message to one or more of his or her contacts, and the system may filter messages to identify only those transmitted between the user and the contact, or between the contact and another party.

At a block 325, the system 200 identifies a topic in the filtered correspondence messages. In some implementations, the system identifies a topic in information related to the instruction received at block 310. For example, the instruction may include that a message being drafted is addressed to a customer service representative for a particular product. The system may identify the product as a topic. The system also identifies topics based on identifying topics or words or phrases related to topics in correspondence messages.

Figure 4:
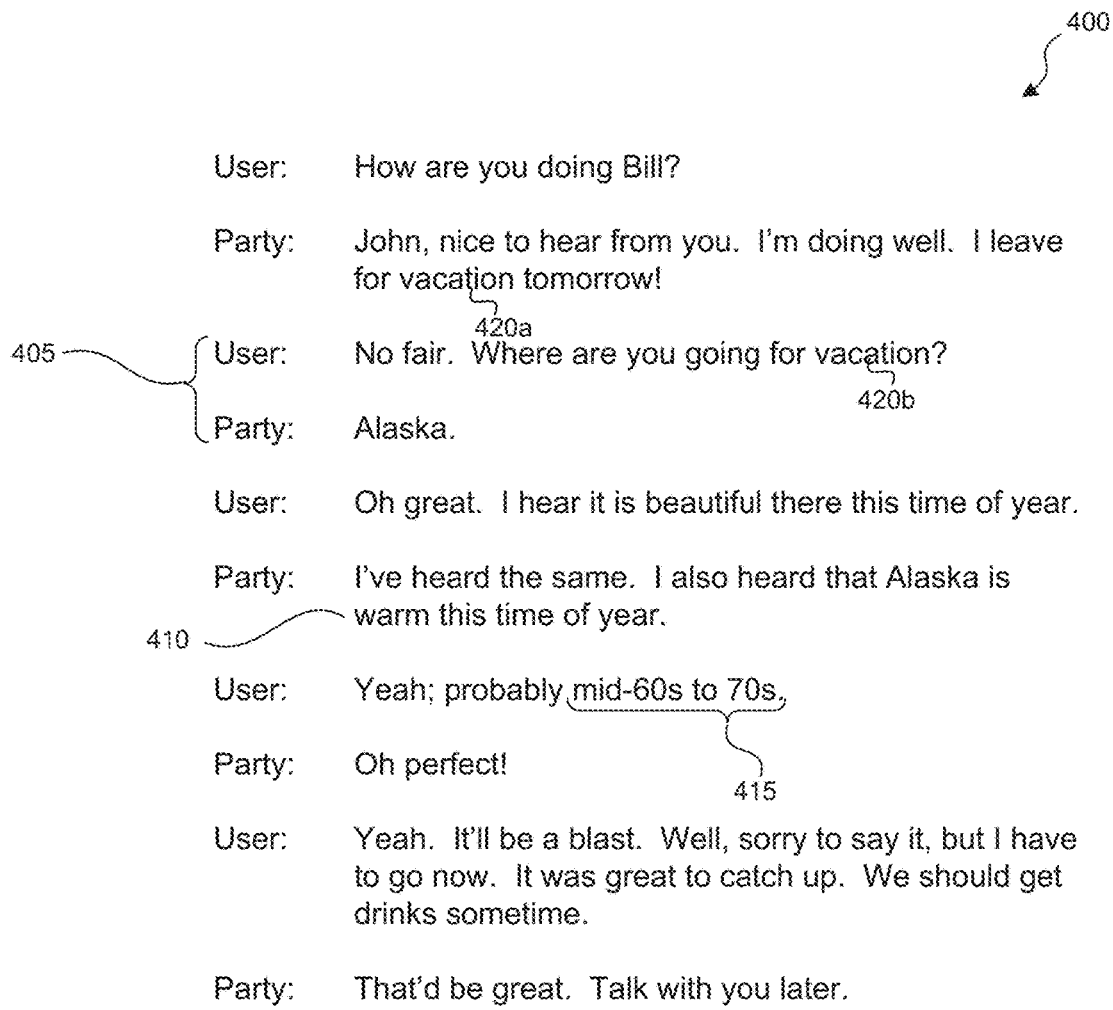
FIG. 4 shows representative correspondence messages between a user and a party.

FIG. 4 shows representative correspondence messages 400 transmitted between a user and a party. The system may identify a number of different topics in the messages. For example, the system may identify a topic, "Alaska," based on a question and answer pair 405. The system may also identify a topic, "weather," based on keyword 410 "warm" and phrase 415 "mid 60s to 70s." The system can also identify a topic, "vacation," based on a first usage 420a and a second usage 420b in successive messages.

Returning to FIG. 3, at a decision block 330, the system 200 determines whether a topic was identified in the correspondence messages. If no topic was identified, the system proceeds to a block 335 and outputs the existing language model. Alternatively, the system may generate a notification that no optimized language model has been generated (not shown). If a topic is identified, the system proceeds to a decision block 340.

At decision block 340, the system 200 determines whether the identified topic has a predetermined association with any words or sequence of words of the existing language model. In some implementations, the system maintains a list of topics with predetermined associations, which it then compares to the identified topics in the filtered messages.

FIG. 5 shows a representative table 500 correlating topics with associated words, containing topics in a first row and associated words in subsequent rows of each respective topic's column. The table 500 includes topic "Basketball" with associated words "Lakers," "Durant," and "SuperSonics." Similarly, topics "Mountain," "Mexico," and "Hunger," have associated words.

If the identified topic does not have predetermined associations, the process 300 proceeds to a block 335, and the system 200 outputs the existing language model. In some implementations, rather than identifying topics before determining whether the topics have predetermined associations, the system 200 identifies topics only if they have predetermined associations. For example, the system may compare a list of topics and related words to words and phrases in correspondence messages. If at block 340 the system determines that the identified topic does have predetermined associations, the process proceeds to block 345.

At block 345, the system 200 optimizes an existing language model based on the identified topic and corresponding associations. The system optimizes the existing language model by raising a priority in the existing language model of a word or sequence of words associated with the identified topic. For example, the system may assign a greater probability to a word or phrases considered by the language model. Referring to the Table 500 of FIG. 5, if topic "Mexico" is identified, the system would assign higher priority to words "Tequila," "Cabo San Lucas," and "Mazatlán" than the probabilities assigned to these words in the existing language model. In some implementations, the system identifies a pre-existing language model to be used based on an identified topic.

In some implementations, the system increases, by a predetermined or variable amount or percentage, a probability of a word or phrase associated with an identified topic. The system may implement this change by weighting or otherwise modifying a probability associated with a word according to the language model. In some implementations, a probability or weight is associated with each of the words or phrases associated with a topic, indicating a strength of association or relatedness between the topic and the associated word. The probability or weight may be used for optimizing the language model. For example, associated word "Lakers" may have an association weight of three while associated word "SuperSonics" has an association weight of two. Thus, when the language model is optimized, the probability associated with "Lakers" will triple and the probability associated with "SuperSonics" will double.

When the system identifies multiple active topics in a conversation, it raises the priority for associated words of each topic. Sometimes, a word's priority is increased by a relatively greater amount as a result of it being associated with two or more topics identified in a conversation. In some implementations, the system applies a function to a language model, which causes the probability associated with a word to change over time or as a result of an event or a criteria being met. For example, optimizations for a language model may expire after a certain time period. Similarly, priority for a word may be reduced over time or as further messages are transferred between parties and words associated with an identified topic are not identified in new correspondence messages. By doing this, the system may observe a shift in conversation and re-optimize the language model accordingly. At a block 350, the system 200 outputs the optimized language model. In some implementations, the system passes the optimized language model to devices associated with other parties. Accordingly, language prediction applications operating on the other devices can receive the benefits of a language model optimized based on topics that the other parties are likely to discuss.

The system 200 can anticipate a topic for a conversation between two parties and adjust a language model accordingly. In some implementations, the system anticipates a topic not identified in past correspondence messages. As discussed above, the system can anticipate a topic based on a received user selection. One such topic may include customer service related to a particular product or service. Other topics that may be identified based on a received user selection include a region or geographic location of the user, an industry or business associated with the user, a group or type of group that a message is addressed to, or the like, and the system can optimize a language model according to the region or geographic location.

Figure 6:
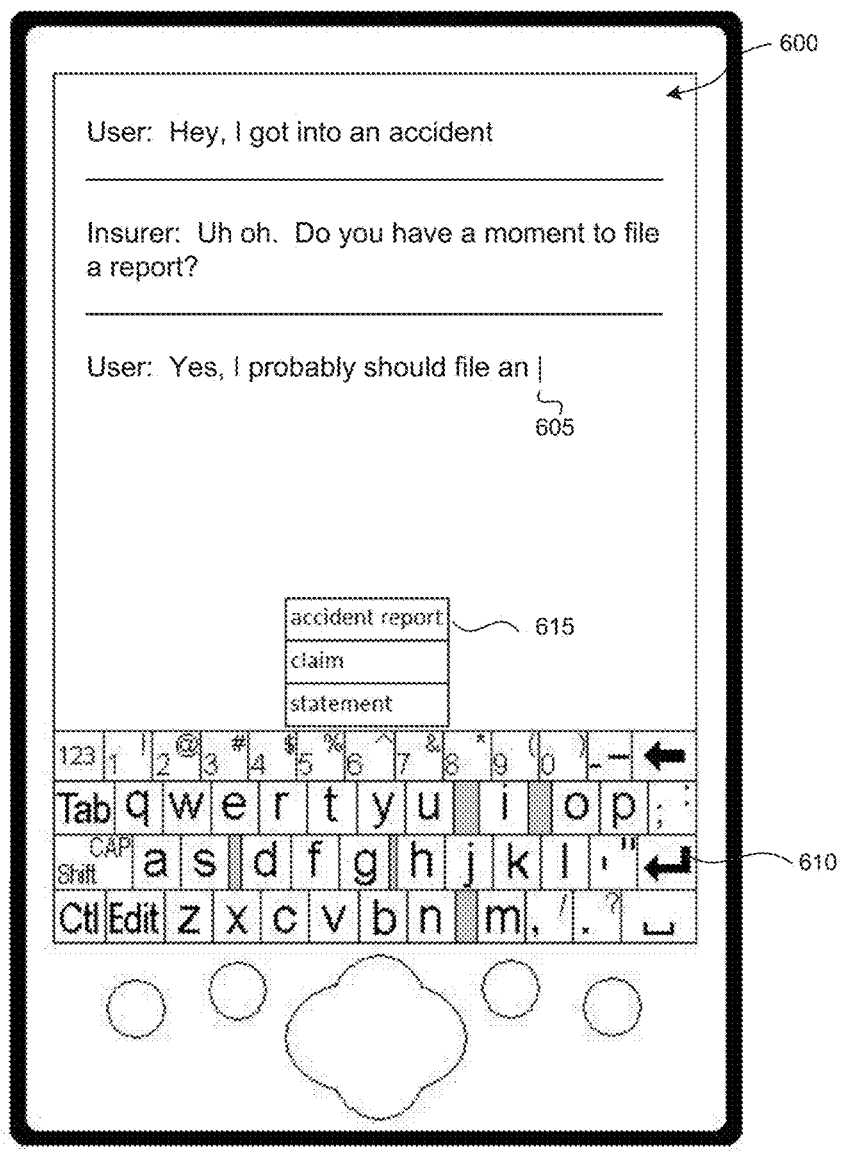
FIG. 6 shows a representative user interface including a virtual keyboard using a language prediction application that utilizes an optimized language model generated by a system according to the present disclosure.

FIG. 6 shows a representative interface 600 for an instant messenger application displaying correspondence messages between a user and a customer service representative of an insurance company. A cursor 605 indicates a location that where a user is entering text. A virtual keyboard 610 displays keys and predicted text 615 that a user may select for entering at the cursor. The predicted text 615 includes "accident report," "claim," and "statement." The predicted text has been identified using a language model optimized for customer service related to auto insurance. For example, a user may select via a computing device to commence an instant messaging session with a customer service representative for an auto insurance company. The system may receive information related to the request, including that the request is being sent to a representative of an auto insurer. Based on this information, the system identifies "auto insurance" and "customer service" as topics for the conversation. The system then optimizes a language model based on these topics, raising a priority for "accident report," "claim," and "statement" in a language model. Finally, when the keyboard 610 using next word prediction predicts a next word to display to the user based on the language model, the keyboard identifies words related to "auto insurance" and "customer service" topics.

Figure 7:
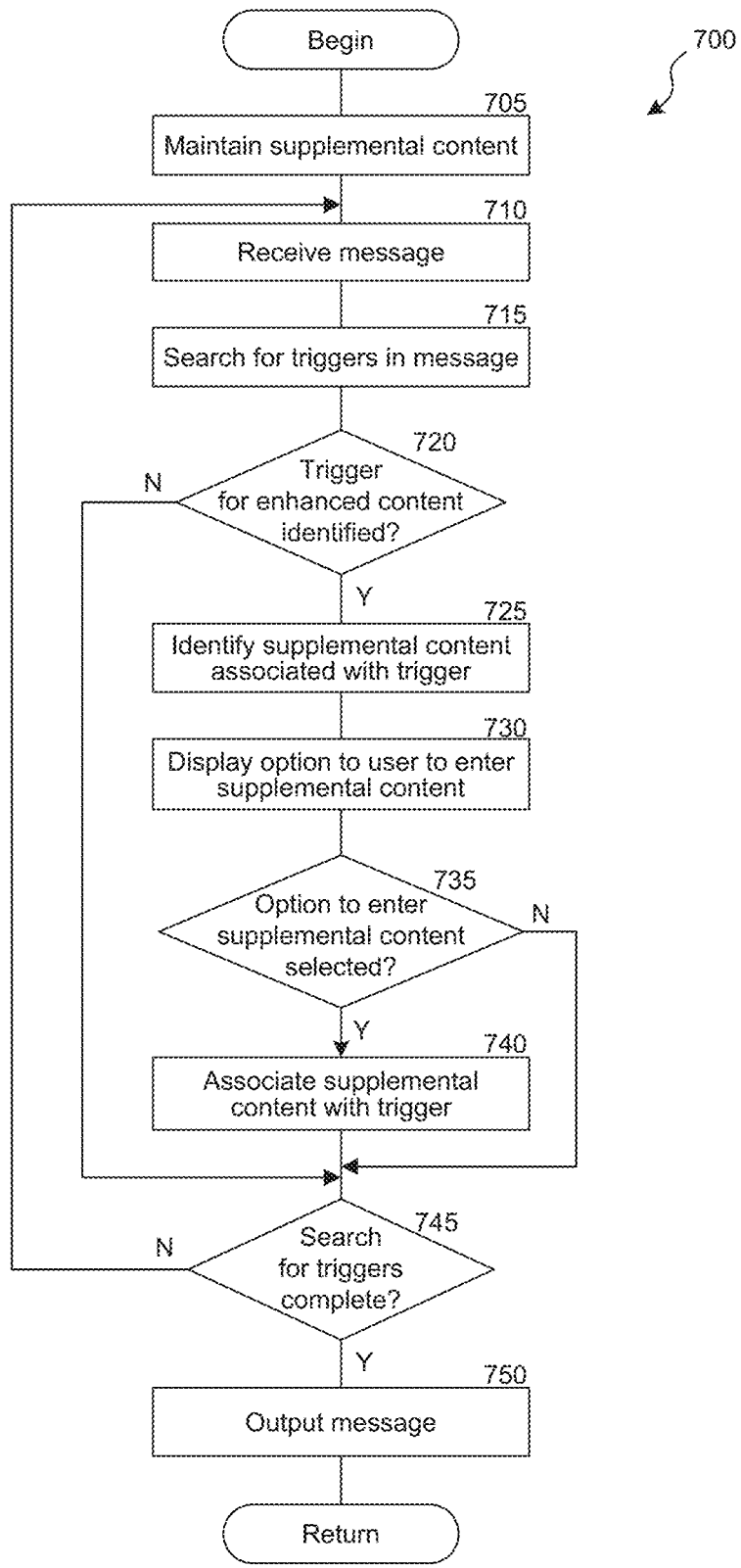
FIG. 7 is a flow diagram depicting a method performed by a system for entering supplemental content in a message for receiving a message from a user and identifying and entering supplemental content in the message.
Figure 8A:
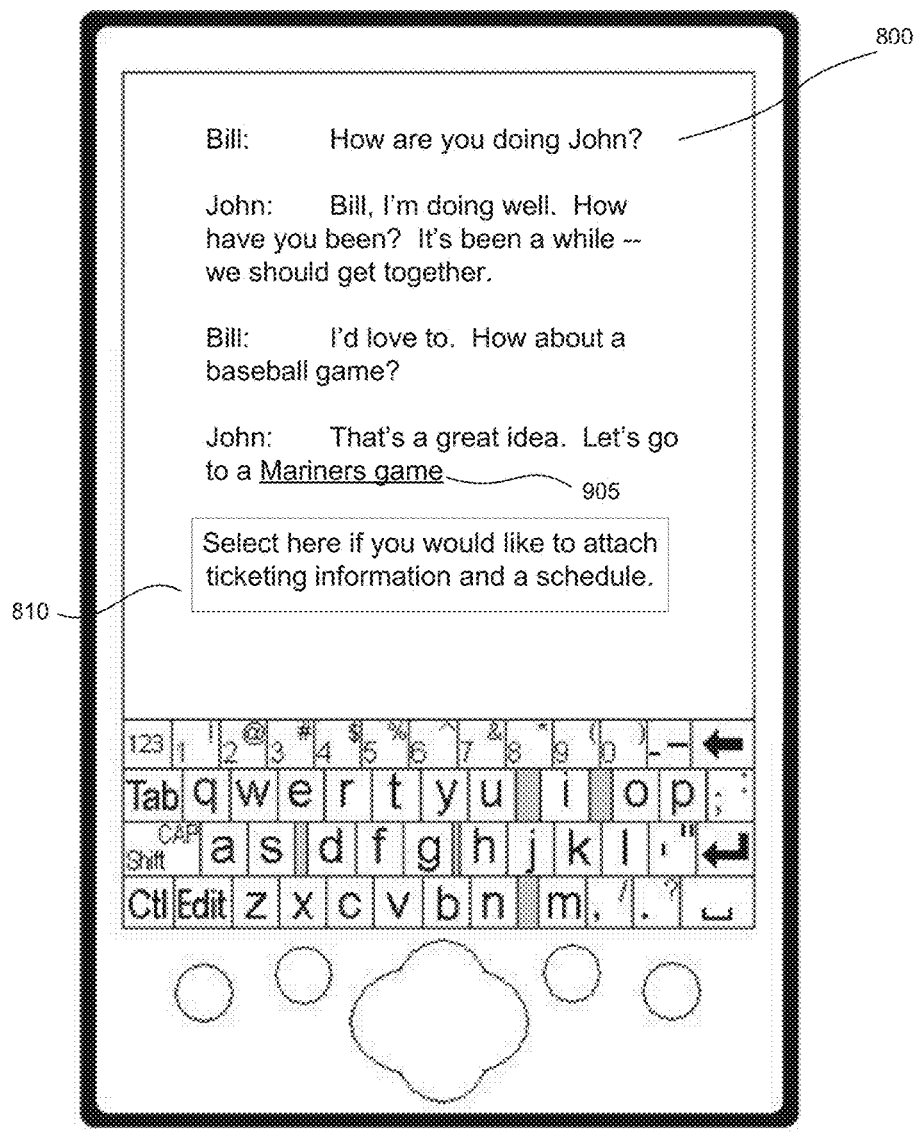
FIGS. 8A, 8B, and 8C show representative interfaces for entering and viewing supplemental content in a message.
Figure 8B:
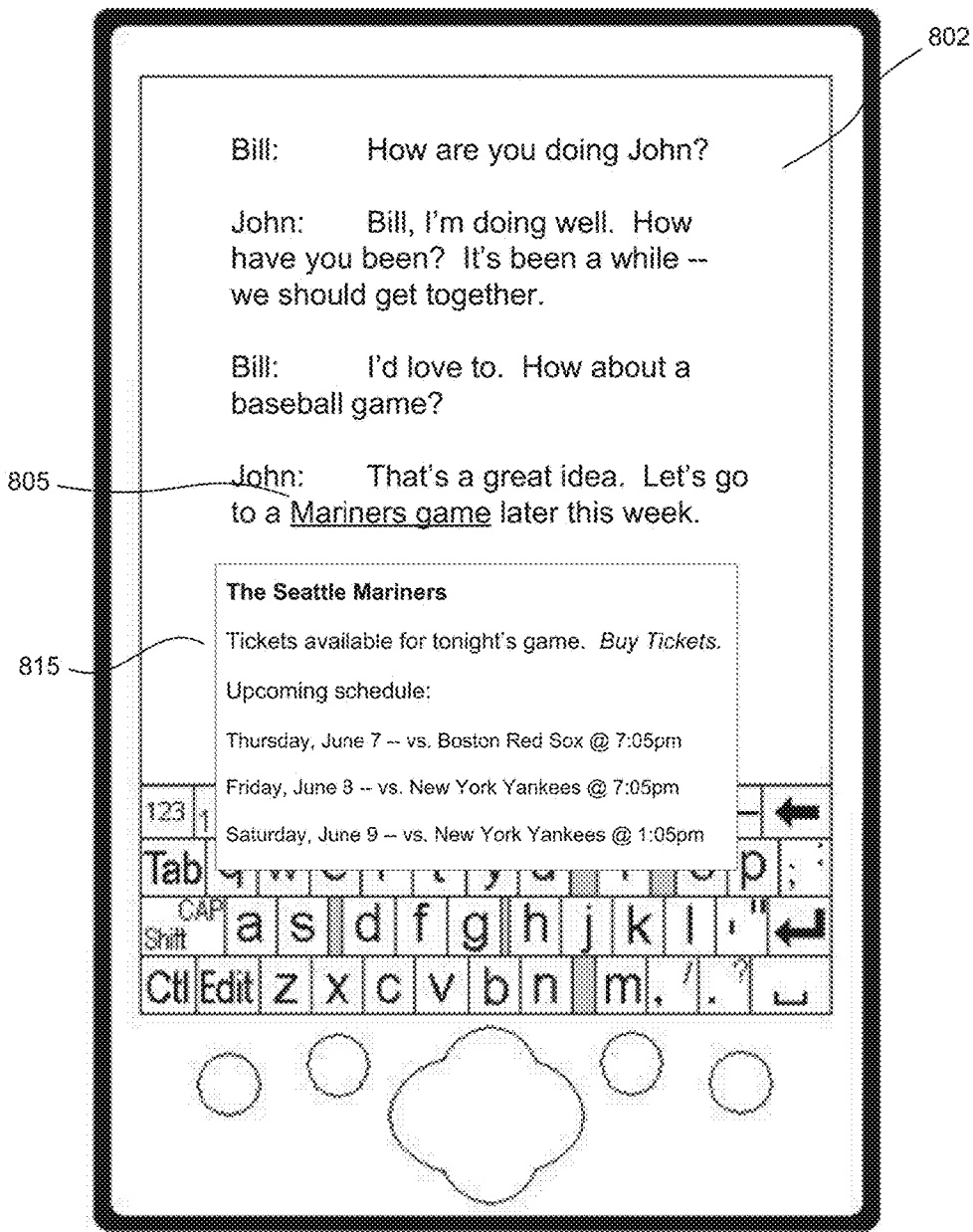
Figure 8C:
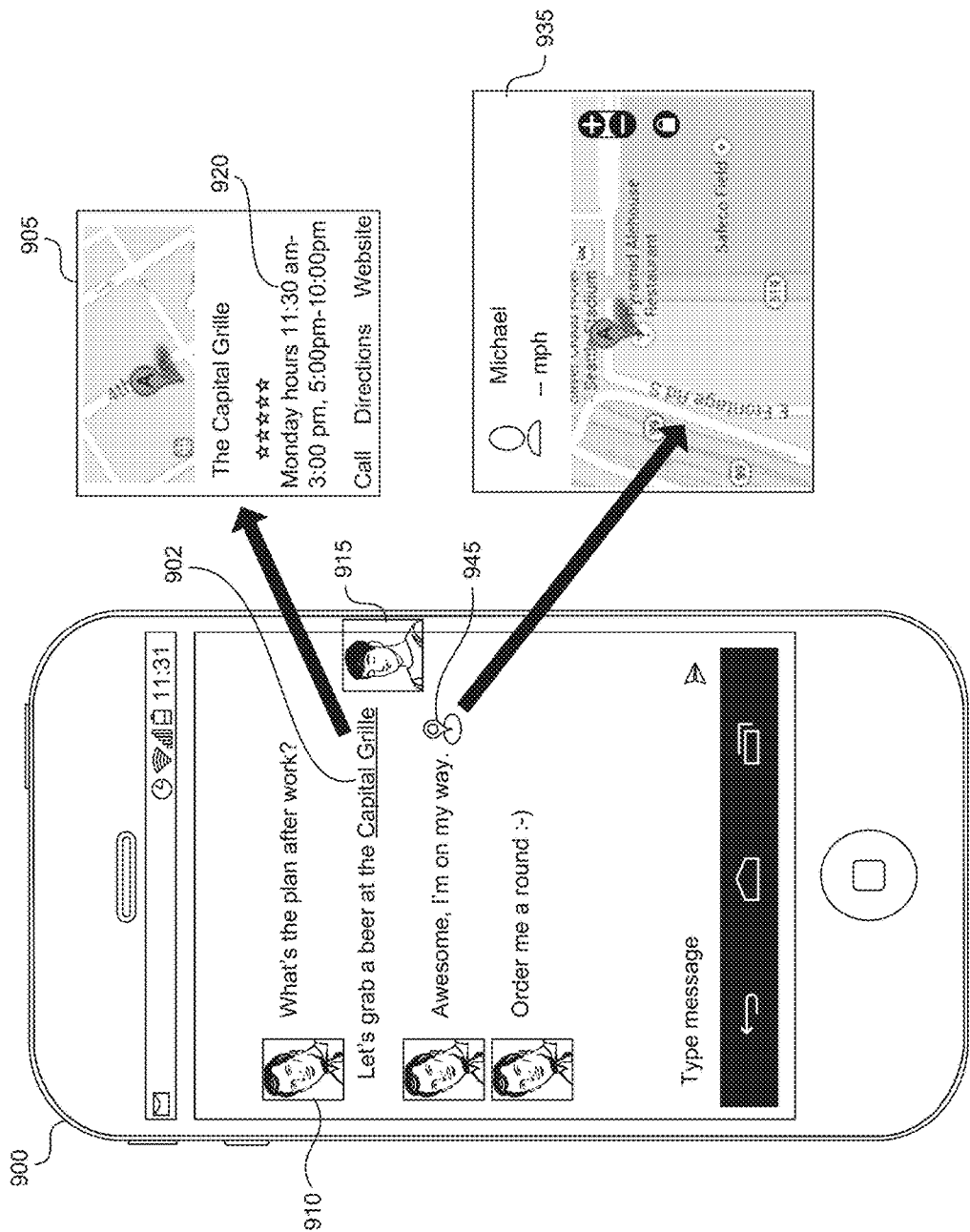

FIG. 7 is a flow diagram of process 700 performed by the system 200 for enhancing a message drafted by a user by associating supplemental content with a portion of the message. The supplemental content is displayed on a device of a user that the message is sent to FIG. 8C shows a representative user interface of a device that is displaying a received message that has been enhanced. For example, words "Capitol Grille" are associated with a menu, which is displayed after a user of the device has selected the link associated with "Capitol Grille."

At a block 705, the system 200 maintains supplemental content. Supplemental content includes text, images, video, and audio, and is stored in association with at least one trigger. In some implementations, supplemental content is unformatted data, and the system formats and configures the data after it is identified for inclusion in a message. For example, the system may modify the unformatted data for appropriate display on a particular device (e.g. a particular brand particular model or brand of smart phone, tablet, laptop, wearable computer (or based on the size of a display on such a device)). The system also maintains metadata associated with the supplemental content. This metadata includes triggers that are associated with the supplemental content, which the system compares to a message for identifying relevant supplemental content for the message.

At a block 710, the system 200 receives a message. Messages include text-based messages, media-based messages, and so forth. In some implementations, the system may receive an entire message, such as one that a user has typed into an instant messaging application, which the user has elected to send to another user. But in other implementations, the system receives a message as it is created, such as when a user types a letter or word in a message, or when a user inserts an image in a message.

At a block 715, the system 200 searches for triggers in the received message. Triggers include letters, symbols, numbers, words, phrases, topics, locations, businesses information, contact information, trademarks, emoji's, and the like, included in a message, which are associated with supplemental information for display to a user. In some implementations, the system searches for triggers by comparing content in a message with stored triggers. For example, the system may identify a trigger word appearing in a list of trigger words if a user types the word in a message.

At a decision block 720, the system 200 determines whether any triggers have been identified. If no trigger has been identified, the process proceeds to a decision block 745, and the system determines whether the search for triggers is complete. In some implementations, if a user has not selected to send a message, the search for triggers is not complete. The search for triggers may end for other reasons (e.g., a certain amount of time has elapsed or the system determines the device is low on power). This block is described in more detail below.

If at decision block 720, the system determines that a trigger has been identified, the process proceeds to a block 725, and the system 200 identifies the supplemental content associated with the trigger. Supplemental content is stored in association with a trigger. FIG. 9 shows a representative table storing triggers in association with supplemental content. If a word or phrase from a trigger column is entered by a user, the system identifies supplemental content associated with that word or phrase. Supplemental content associated with "Capital Grille" includes a PDF of a menu, maps and directions to Capital Grille, Capital Grille's phone number, weather conditions at Capital Grille, and the like. Supplemental content associated with "Space Needle" includes times that reservations are available, hours of operation, map and directions, contact information for the Space Needle, and the like. Supplemental content associated with various words and phrases pertaining to Mariners baseball includes ticketing information (including links that a user may select to buy tickets), weather at the Mariners' stadium, baseball season opening and closing dates, and the like. In some implementations, the system compares triggers associated with supplemental content to text or other content entered by a user in a message, and if a trigger is similar to text or other content entered by the user, or if a trigger is otherwise associated with entered content, the system identifies the supplemental content associated with the related trigger for entry in the message. The system can use the optimized language model, from block 345, to identify triggers. In some embodiments, based on the language model and assigned probabilities to different trigger words (e.g., "baseball" is 0.1, "hungry" is 0.5, "baseball and food" together is a 0.7), the system will identify supplemental content that should be included with each message, and then display this supplemental content to the user.

Also, in some implementations, the system 200 compares triggers associated with context. For example, if a user writes a message that states "let's go to the game," at block 725, the system 200 uses the trigger ("game") with user GPS coordinates. If the user's GPS coordinates indicate that the user is close to a Mariners game, then system 200 displays an option at block 730 to the user to buy tickets for the Mariner's game that evening. Furthermore, the system uses other context information to display an option to the user at block 730 including, but not limited to, weather, season, and time. Thus, if the user's GPS coordinates indicate the user is in Seattle, it is spring time, and it is in the evening, system 200 displays an option for the user to enter to buy tickets to a Mariner's game because the system 200 determines the trigger for enhanced content based on the identified words and the context input. Specifically, system 200 determines that baseball is played in the spring time, and there is a game this evening based on information stored in the relevant databases.

In some embodiments, system 200 saves a user's response to display supplemental content information in a database. For example, the system 200 saves information that a user selected to enter in supplemental content to buy Mariner's tickets. The system can save this information in a database (e.g., correspondence message data storage 275). Then, if the user begins a conversation with the same person with similar language, the system 200 can suggest another Mariner's game ticket.

Additionally, in some embodiments, system 200 identifies supplemental content to be displayed based on a sensor in the user's mobile device 102 or 105. For example, a user may send a message to his or her parent stating "I'm sick," "my back hurts," or "I feel like I have a fever." The mobile device 102 contains a sensor to notice the user's blood pressure is high or the user's temperature is high. Also, in a trigger table similar to FIG. 9 (not shown for this example), the topic for health includes a supplemental content for scheduling an doctor's appointment. At block 725, the system 200 determines that based on the language used in the correspondence and the user's temperature from the mobile device 105, it will display the location of a hospital for a user to go to or the phone number for a doctor. Also, the supplemental content to recommend an over-the-counter medicine and location to purchase the medicine. Either the user writing the message or the user receiving the message can use the supplemental content use (e.g., a parent receives a text message from a child that the child is not feeling well, the parent can locate a hospital or pick up medicine at a local pharmacy described in the supplemental content).

At a block 730, the system 200 displays an option to the user to enter the supplemental content associated with the trigger. The option may include instructions for entering supplemental content. FIG. 8A shows a representative interface 800 generated by a device for a messaging application, displaying correspondence messages between a user of the device and a friend. The user has entered "Mariners game," which the system has identified as a trigger 905, and underlined to indicate that it is a trigger. The system generates a text box 810 which includes an instruction to the user to select the text box in order to enter supplemental information. In some implementations, the system automatically enters supplemental content without receiving instructions from a user to do so.

At a decision block 735, the system 200 determines whether an option to enter supplemental content has been selected. If the user has not selected to enter supplemental content, or selects to not enter supplemental content, the process proceeds to block 745. If the user does select to enter supplemental content in the message, the process proceeds to a block 740.

At block 740, the system 200 associates supplemental content with the identified trigger. Associating supplemental content with the trigger includes formatting the supplemental content. In some implementations, associating supplemental content includes filtering or otherwise modifying identified supplemental content. The system can tailor identified supplemental content based on any of a number of factors. Supplemental content can be modified based on a user, a physical setting for the mobile device, an intended recipient of a message, content in a message, user input, and the like. For example, referring to the table of FIG. 9, if a user entered in a message the phrase "Let's go to the Space Needle for dinner," the system may truncate the reservation information associated with "Space Needle," and offer the user the option to enter only reservation information related to dinner. The system can associate supplemental content with a trigger by adding the supplemental content directly to the message. For example, the supplemental content may be added to a window within a messaging application. The system can also associate supplemental content with a trigger by adding a link (e.g., an html link, a deep link, an link to an application a mobile device, a menu, and the like) to the supplemental content.

At decision block 745, the system 200 determines whether the search for triggers is complete. In some implementations, the system determines that a search for triggers is complete based on the user selecting to send a message. In some implementations, the system determines that a search is not complete based on the user continuing to enter content in the message. In some implementations, the system searches for triggers after a word is typed by a user, determined, for example, when the user selects to enter a space or a predetermined punctuation mark (e.g., a period). In some implementations, the system searches for triggers after an amount of time has passed (e.g., 2 minutes after a message has been entered). If the system determines that the search for triggers is not complete, the process returns to block 710, and the system receives a message. As mentioned above, the message may include new content entered by the user in a message already being processed by the system. If the system determines that the search for triggers is complete, the process proceeds to a block 750, and the system outputs a message that includes supplemental content.

The message outputted by the system can include supplemental content displayed in a number of ways. In some implementations, supplemental content is embedded in the message. For example, supplemental content may be added next to text of a message. Also, for example, supplemental content may be underlined, bolded, or appear differently compared to other text in the message. Supplemental content may also be automatically displayed by a messaging application. In some implementations, a trigger word in the message acts as a link, and when a user hovers over or selects the trigger word, supplemental content is displayed. For example, referring again to FIG. 8A, user John may select to add supplemental information to the message, linking trigger 905 "Mariners game" with supplemental information. FIG. 8B shows a representative interface 802 generated by a device for an instant messaging application, displaying correspondence messages between a user of the device (i.e., Bill) and the user of the device. The interface 802 shows the trigger 805 corresponding to "Mariners game," and supplemental content 815 displaying the upcoming schedule for the Seattle Mariners. The system displays the supplemental content 815 after receiving a selection of trigger 805, displaying the supplemental content in a text box over a virtual keyboard and the messaging interface.

While it is not shown in FIG. 8B, the system 200 may modify the display of the supplemental content based on context input. For example, if the user's GPS coordinates indicate the user is not in Seattle at the present moment, and there is a game that evening, the system may display supplemental content for the game, but for the following day. Also, in system 200, the trigger 805 corresponding to a Mariner's game includes supplemental information for weather, the system 200 may display a small icon indicating it is a raining or it may display options to buy tickets on a different day.

The system 200 also provides supplemental content analytics. The system can measure the sending, viewing, and engagement of supplemental content. In some implementations, the system performs sentiment analysis related to the usage of supplemental content and provides feedback to a creator of the supplemental content related to its usage.

FIG. 8C shows a representative interface 900 on a user's mobile device. The user's device displays an instant messaging application with a correspondence message chain between a two users. An entity 902 (e.g., a business like Capital Grille) registers their name and provides information (e.g., locations, contact information, website, menu, coupons, and the like) in a advertising content database 250. Then, one party 910 enters text (e.g, "what's the plan after work?") and sends it to another party 915. Another party 915 replies (e.g., "let's grab a beer at the Capital Grille") to the other party. The interface 900 displays supplemental content 920 after receiving the trigger 930 ("Capital Grille"). The user can view or select the supplemental content by hovering over or selecting the underlined trigger on the interface 900. The supplemental content 920 may be a deep link or a push menu button (in FIG. 8C the hours of operation, an option to call the business, and a link to the business website is included). When the other party 915 replies with the trigger words "I'm on way my way," system 200 will identify supplemental content associated with this trigger such as the location of the user similar to 935. The system may display the supplemental content to the user as an icon 945, which when a user hovers over displays the location of the user based on GPS coordinates of the user.

While this example shows an entity registering their information before a conversation takes places, an entity could register their information before, during, or after a conversation. For example, if an entity registers their information after a conversation, the parties can now review the conversation with an enhanced message including supplemental content with a portion of the message. The advertising content database 250 may be updated regularly to reflect changes, and an advertising business may bid to have certain trigger words associated with supplemental content related to their business.

While not shown in FIG. 8C, a representative interface 900 can include private data as supplemental content. For example, if User A asks User B for User C's contact information in a text messaging platform (e.g., User A writes "what is User C's phone number?"), system 200 will recognize "User C's phone number," as a trigger for C's contact information. Then, when User B replies to User A, system 200 will suggest to User B to include supplemental content (e.g., an embedded link or attachment) with User C's contact information. Furthermore, system 200 now understands that User A intends to contact User C, and system 200 can incorporate language and topics from User A's conversation with User B in a language model. For example, if User A and User B were coordinating a trip to a winery in Woodinville, system 200 would include words like "Woodinville," and "winery," in the anticipated language model for a conversation between User A and User C. System 200 would also use the anticipated language model to incorporate supplemental content into a conversation between User A and User C (e.g., hours of operation for a winery in Woodinville or location of the winery). Finally, system 200 can incorporate privacy settings into the supplemental content. For example, User's C contact information may only be available for 5 min after User A receives the contact information. The timing of when system 200 incorporates a specific language model or privacy setting may vary.

CONCLUSION

Those skilled in the art will appreciate that the actual implementation of a data storage area may take a variety of forms, and the phrase "data storage" is used herein in the generic sense to refer to any storage device that allows data to be stored in a structured and accessible fashion using such applications or constructs as databases, tables, linked lists, arrays, and so on.

The words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various examples described above can be combined to provide further implementations of the disclosure. Some alternative implementations of the disclosure may include not only additional elements to those implementations noted above, but also may include fewer elements.

These and other changes can be made to the disclosure in light of the above Detailed Description. While the above description describes certain examples of the disclosure, and describes the best mode contemplated, no matter how detailed the above appears in text, the disclosure can be practiced in many ways. Details of the system may vary considerably in its specific implementation, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

To reduce the number of claims, certain aspects of the disclosure are presented below in certain claim forms, but the applicant contemplates the various aspects of the disclosure in any number of claim forms. For example, while only one aspect of the disclosure is recited as a computer-readable medium claim, other aspects may likewise be embodied as a computer-readable medium claim, or in other forms, such as being embodied in a means-plus-function claim. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A tangible non-transitory computer-readable storage medium containing machine-implementable instructions for performing a method of entering supplemental content in a message, the method comprising:
    maintaining supplemental content associated with a first trigger and supplemental content associated with a second trigger, wherein the first trigger is a word or phrase, and wherein the first trigger, the second trigger, and the supplemental content are stored in a data structure;
    receiving a message with content, wherein the message has been sent from at least a first user to a second user; searching the content of the message for the first trigger; searching content of a draft response message for the second trigger,
    wherein the draft response message is input via a virtual keyboard provided to a user of a computing device; identifying the supplemental content associated with the first or second trigger,
    wherein the identifying includes accessing the data structure based on the first trigger, the second trigger, or both the first and second triggers; and displaying one or more options to enter the supplemental content associated with the first or second trigger into the draft response message,
    wherein the one or more options are displayed to the user proximate to the virtual keyboard; receiving a selection of an option of the one or more options to enter the supplemental content; and inserting the supplemental content into the draft response message, wherein the supplemental content enhances the content of the draft response message.

2. The tangible non-transitory computer-readable storage medium of claim 1, further comprising: analyzing a private, text-based conversation between two parties based on a virtual keyboard provided to a user of a mobile device.

3. The tangible non-transitory computer-readable storage medium of claim 1, further comprising, creating a message with supplemental content, wherein the created message is a two-party text-based message with supplemental content that includes: a video, an image, an audio clip, formatted text, or a URL link.

4. The tangible non-transitory computer-readable storage medium of claim 1, wherein the supplemental content includes a link, deep link, a video, GPS coordinates, a menu, an advertisement, contact information, or a phone number.

5. The tangible non-transitory computer-readable storage medium of claim 1, further comprising: searching the content of a sent message for a third trigger, wherein the sent message was created from the draft message, and wherein the third trigger can be the same as or different than the first and second trigger.

6. The tangible non-transitory computer-readable storage medium of claim 1, further comprising: determining a new topic based on additional topics or text provided in a new message and a new draft message; and updating the supplemental content with additional triggers based on the new topics or text.

7. The tangible non-transitory computer-readable storage medium of claim 1, further comprising: determining or accessing a weight associated with first and second triggers; and, determining when to provide the supplemental content based on an algorithmic comparison of the weights for the first and second triggers.

8. The tangible non-transitory computer-readable storage medium of claim 1, wherein the data structure includes weights associated with multiple triggers, and wherein certain supplemental content is provided only after a threshold is met based on an algorithmic combination of weights from at least two triggers.

9. A system for entering supplemental content in a message, the system comprising: at least one non-transitory memory containing a data structure and computer-executable instructions;
wherein the data structure includes a) multiple text-based triggers, and b) supplemental content for enhancing a text-based message, and
wherein the supplemental content is associated with at least one of the text-based triggers;
wherein the computer-executable instructions include instructions to: analyze a received text-based message to identify one or more of the triggers,
wherein the text-based message is a message exchanged between a user and another party;
and wherein the one or more triggers are associated with specific supplemental content; determine a time to provide to the user an indication of an availability of the specific supplemental content;
display to the user an option to add the specific supplemental content to a draft text-based message,
wherein the draft text-based message is input via a virtual keyboard provided to the user; and wherein the option to add the specific supplemental content is displayed to the user proximate to the virtual keyboard;
insert the specific supplemental content into the draft text-based message after the user selects the option; and
at least one processor for executing the computer-executable instructions stored in the memory.

10. The system of claim 9, wherein the system includes a touchscreen display device, a portable power source, a wireless transceiver, and a hand-held housing for carrying the memory, processor, display device, power source and transceiver.

11. The system of claim 9, wherein the system is incorporated into a smart phone, where the text-based message is an SMS or MMS message, and wherein the supplemental content includes a URL link, GPS coordinates, a portion of formatted content obtained from a website, an advertisement, or contact information.

12. The system of claim 9, wherein the triggers include words or phrases, and wherein determining the time to provide to the user the indication includes comparing, to a threshold value, a frequency that a specific word or phrase associated with a topic is used within a predetermined period of time.

13. The system of claim 9, wherein the data structure stores weights or probability values associated with the triggers, and wherein determining the time to provide to the user the indication includes analyzing the weights in relation to a text in the text-based message.

14. The system of claim 9, wherein determining the time to provide to the user the indication includes determining a scenario as a combination to two triggers, wherein a text-based message that includes the combination of the two triggers within substantially adjacent messages within a text-based conversation causes the system to provide an indication that certain supplemental content stored in the data structure can be provided.

15. A method of entering supplemental content in a message, the method comprising:
maintaining supplemental content associated with a first trigger and supplemental content associated with a second trigger,
wherein the first trigger is a word or phrase, and
wherein the first trigger, the second trigger, and the supplemental content are stored in a data structure;
receiving a message with content,
wherein the message has been sent from at least a first user to a second user;
searching the content of the message for the first trigger;
searching content of a draft response message for the second trigger,
wherein the draft response message is input via a virtual keyboard provided to a user of a computing device;
identifying the supplemental content associated with the first or second trigger,
wherein the identifying includes accessing the data structure based on the first trigger, the second trigger, or both the first and second triggers; and
displaying one or more options to enter the supplemental content associated with the first or second trigger into the draft response message,
wherein the one or more options are displayed to the user proximate to the virtual keyboard;
receiving a selection of an option of the one or more options to enter the supplemental content; and
inserting the supplemental content into the draft response message,
wherein the supplemental content enhances the content of the draft response message.

16. The method of claim 15, further comprising, analyzing a private, text-based conversation between two parties based on a virtual keyboard provided to a user of a mobile device.

17. The method of claim 15, further comprising, creating a message with supplemental content, wherein the created message is a two-party text-based message with supplemental content that includes: a video, an image, an audio clip, formatted text, or a URL link.

18. The method of claim 15, wherein the supplemental content includes a link, deep link, a video, GPS coordinates, a menu, an advertisement, contact information, or a phone number.

19. The method of claim 15, further comprising, searching the content of a sent message for a third trigger, wherein the sent message was created from the draft message, and wherein the third trigger can be the same as or different than the first and second trigger.

20. The method of claim 15, further comprising:
   determining a new topic based on additional topics or text provided in a new message and a new draft message; and
   updating the supplemental content with additional triggers based on the new topics or text.

\* \* \* \* \*